US012322214B1

(12) United States Patent
Halley et al.

(10) Patent No.: US 12,322,214 B1
(45) Date of Patent: *Jun. 3, 2025

(54) SYSTEM FOR TOLLING

(71) Applicant: TOLLSCOPIC LLC, Miami, FL (US)

(72) Inventors: Daniel Ignacio Halley, Miami, FL (US); Ignacio Halley, Miami, FL (US); Michael Anthony Halley, Miami, FL (US); Alejandro Andres Halley, Miami, FL (US); Alexander Medina Monteagudo, Dublin (IE); Robert F. Hugues, Miami, FL (US); Raciel Leiva, Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/927,496

(22) Filed: Oct. 25, 2024

Related U.S. Application Data

(63) Continuation of application No. 18/744,321, filed on Jun. 14, 2024, now Pat. No. 12,190,644.

(51) Int. Cl.
| | |
|---|---|
| *G07B 15/06* | (2011.01) |
| *G06T 7/292* | (2017.01) |
| *G06V 10/764* | (2022.01) |
| *G06V 20/40* | (2022.01) |
| *G06V 20/54* | (2022.01) |

(Continued)

(52) U.S. Cl.
CPC ............ *G07B 15/06* (2013.01); *G06T 7/292* (2017.01); *G06V 10/764* (2022.01); *G06V 20/41* (2022.01); *G06V 20/44* (2022.01); *G06V 20/54* (2022.01); *H04N 7/181* (2013.01); *H04N 7/188* (2013.01); *G06T 2207/10016* (2013.01); *G06T 2207/30241* (2013.01); *G06T 2207/30242* (2013.01);

(Continued)

(58) Field of Classification Search
CPC ............ G07B 15/06; G06T 7/292; G06T 2207/10016; G06T 2207/30241; G06T 2207/3024; G06V 20/54; G06V 20/41; G06V 10/764; G06V 20/44; G06V 2201/08; G06V 2201/10; H04N 7/181; H04N 7/188; H04N 23/695; H04N 23/90

See application file for complete search history.

(56) References Cited

U.S. PATENT DOCUMENTS

| | | |
|---|---|---|
| 8,937,559 B2 | 1/2015 | Ioli |
| 10,354,457 B2 | 7/2019 | Povolny |

(Continued)

*Primary Examiner* — Jae N Noh
(74) *Attorney, Agent, or Firm* — Sanchelima & Associates, P.A.; Jesus Sanchelima; Christian Sanchelima

(57) ABSTRACT

A smart tolling system employs computer vision and machine learning techniques to automatically track and monitor vehicles across multiple video streams captured by a networked camera assembly. The system derives comprehensive vehicle trajectories by stitching together detections of each vehicle from the various video feeds using multi-object tracking algorithms. These trajectories enable correlating different events triggered by the vehicles at multiple roadside devices like cameras and radars. By mapping the trajectories in space and time, the system can associate seemingly fragmented events and synthesize complete vehicle profiles even when certain events may have missed capturing some vehicle information due to obstructions or other factors. This trajectory-based event correlation enhances tolling accuracy by minimizing revenue leakage from missed or incomplete vehicle data in congested traffic conditions.

9 Claims, 12 Drawing Sheets

(51) Int. Cl.
*H04N 7/18* (2006.01)
*H04N 23/695* (2023.01)
*H04N 23/90* (2023.01)

(52) U.S. Cl.
CPC ...... *G06V 2201/08* (2022.01); *G06V 2201/10* (2022.01); *H04N 23/695* (2023.01); *H04N 23/90* (2023.01)

(56) References Cited

U.S. PATENT DOCUMENTS

| | | |
|---|---|---|
| 10,970,941 B2 | 4/2021 | Gillies |
| 11,643,102 B1 * | 5/2023 | Calmer .................. G06N 3/047 340/576 |
| 2014/0037142 A1 | 2/2014 | Bhanu et al. |
| 2019/0325580 A1 * | 10/2019 | Lukac .................. G06T 3/4038 |
| 2019/0378347 A1 | 12/2019 | Gallaway et al. |

* cited by examiner

SYSTEM FOR TOLLING

BACKGROUND OF THE INVENTION

1. Other Related Applications

The present application is a continuation patent application of allowed and pending U.S. patent application Ser. No. 18/744,321, filed on Jun. 14, 2024, which is hereby incorporated by reference.

2. Field of the Invention

The present invention relates to vehicle tracking and tolling systems and, more particularly, to a system for tolling that generates vehicle identification data employing computer vision, wherein the system hinges on machine learning (ML) and artificial intelligence (AI) algorithms.

3. Description of the Related Art

Numerous systems have been proposed and implemented for collecting fares, tolls, or entrance fees at control points, as well as for road pricing or congestion charging of vehicles and vehicle users, commonly known as automatic toll systems. However, traditional legacy approaches suffer from several drawbacks compared to the present invention:

Architecture: Legacy systems typically employ rigid, roadside server-dependent architectures that struggle with scalability and adaptability to changing requirements.

Performance: These systems often exhibit low accuracy, high false positive rates and rely primarily on rule-based approaches, which can be inflexible and struggle with edge cases.

Reliability and Availability: Legacy toll systems are prone to downtime, slow error recovery, and poor fault tolerance, leading to potential revenue losses and traffic disruptions.

Operations and Incident Response: Many legacy systems are built on inflexible, proprietary software lacking advanced features for monitoring, incident response, and operational analytics.

Cost of Deployment and Maintenance: Implementing traditional toll systems frequently incurs high costs, with deployment projects spanning three or more years and causing major traffic disruptions during construction.

Adaptability and Interoperability: Extending the functionality of legacy systems is often challenging due to their monolithic designs, resulting in isolated data silos and complex manual update processes that hinder interoperability with other systems.

Applicant believes that a related reference corresponds to U.S. Pat. No. 10,970,941 to Vertex Aerospace LLC, which teaches an automated electronic tolling system used for transactions and, more particularly, to cameras for electronic tolling systems. The patent teaches a single/array camera system for capturing multi-view vehicle images for identification/classification. As elaborated below, the instant specification presents a more holistic vehicle monitoring solution using trajectory mapping and correlated event data across a network of cameras. The trajectories enable synthesizing comprehensive vehicle profiles robust to obstructions. For instance, in the instant specification it is described a system that uses trajectory mapping and event correlation to stitch together multiple events/detections of a vehicle from different cameras to create a comprehensive vehicle profile, even when certain data is obstructed or missed at individual events. The patent, on the other hand, teaches using a single camera or synchronized camera array aimed straight down to capture multi-perspective images (front, rear, top, side) of a vehicle in one field of view. In another instance, the instant specification describes two distinct operating modes: active mode (using multi-object tracking to trigger cameras) and passive mode (cameras trigger events independently). In yet another instance, the instant specification describes using machine learning to dynamically adjust camera settings based on environmental conditions for optimal image quality. The patent is silent about environmentally adaptive camera configuration.

Applicant believes that another related reference corresponds to U.S. Patent Application Publication No. 20190378347 to Raytheon Co, which discloses a system that executes ML models to classify vehicles by number of axles for determining a toll charge and issue the toll charge based on the classified number of axles.

U.S. patent application No. 20140037142 to the University of California teaches a method and system called hierarchical vehicle classification system using a video and/or video image, a method and system of vehicle classification using a vehicle ground clearance measurement system, and a method and system for classification of passenger vehicles and measuring their properties, and more particularly to capturing a vehicle traveling along a road from a single camera and classifying the vehicle into a vehicle class.

U.S. Pat. No. 10,354,457 to Kapsch TrafficCom AG teaches a method for tolling one or more locations of a vehicle having a license plate number by means of a tolling system having a camera at each location to be tolled, a server, a database, a user terminal, and a network linking the camera(s), server and user terminal.

U.S. Pat. No. 8,937,559 to Motorola Solutions Inc discloses a surveillance system for monitoring a plurality of vehicle license plates comprising a portable license plate reader including a camera for automatically imaging a license plate and extracting a character string from the image for each of a plurality of moving vehicles that pass through a field of view of the camera without detection by the moving vehicles.

The present invention introduces a novel approach to automatic toll collection and vehicle monitoring that addresses several key limitations of legacy systems. Unlike conventional static camera setups that rely on capturing vehicle information at a single point, the present solution leverages video streams to create comprehensive trajectory maps of vehicle movements. By tracking a vehicle's path across multiple "events" or positions, the system can cross-reference and piece together complete vehicle information (make, model, license plate, and even driver imagery) even when specific details are obstructed or blocked at individual events, such as in bumper-to-bumper traffic scenarios.

The present invention operates in two distinct modes: active and passive. The end goal is the same for both operating modes: grouping by vehicle a number of events emitted by multiple devices. In active mode, instead of relying solely on camera triggers, the system intelligently triggers events based on the vehicle's location along its trajectory. Each event captures a wealth of vehicle data, including license plates, make and model details, and driver imagery. Crucially, by stitching together these events into a coherent trajectory map, the system can overcome the limitations of conventional approaches that fail to capture complete information when license plates or other identifiers are obstructed at certain points.

The passive mode, while requiring more expensive hardware, reduces the reliance on roadside servers, potentially lowering operational costs. Conversely, the active mode utilizes less expensive hardware but necessitates more investment in roadside server infrastructure.

A key innovation of the present invention is the use of trajectory mapping to connect events and address the problem of missing or obstructed vehicle information in congested traffic conditions. This is achieved by employing statistical methods, such as the "nearest neighbor" method, to group events along a vehicle's trajectory line, enabling the system to fill in any gaps or missing data points by cross-referencing information from other events in the trajectory.

In contrast, legacy systems lack the capability to connect events using trajectory mapping, rendering them vulnerable to incomplete data collection and subsequent revenue leakage for toll agencies due to missing vehicle information in some scenarios.

Legacy tolling systems generate transactions for a given vehicle A based solely on the signals captured at a specific gantry X at time t. However, the present invention can incorporate signals from multiple gantries across the entire tolling network.

The invention models the network of gantries (which may span multiple roads) as a Markov chain-a stochastic model describing a sequence of events where the probability of each event depends only on the previous state. For example, if a vehicle A is detected at gantry X at time t, the system can predict that A will likely be at gantry Y at time t1 with probability p1, or at gantry Z at time t2 with probability p2, and so on.

These predictions and probabilities are determined by combining: 1) The network topology, represented as a graph, with gantries as vertices and road segments as edges. 2) Dynamic traffic parameters like median speeds, accidents etc. along each edge.

Incorporating data from multiple gantries across the network, rather than just the local gantry, enables increasing the confidence of vehicle matching and tolling transaction generation. This cross-gantry signal correlation is a key advantage over current solutions that rely only on single-gantry data.

Furthermore, the solution posited by the present invention offers additional functionalities beyond toll collection, such as lane violation detection, accident monitoring, and more, without the need for costly radar installations.

By addressing the critical challenge of obstructed vehicle information in high-traffic conditions, the disclosed trajectory-based approach minimizes revenue leakage for toll agencies, enabling them to collect tolls from a higher proportion of vehicles by piecing together complete vehicle data from multiple events along each vehicle's trajectory. This translates to increased revenue generation and operational efficiency compared to legacy systems that struggle with incomplete data collection in such scenarios.

Other documents describing the closest subject matter provide for a number of more or less complicated features that fail to solve the problem efficiently and economically. None of these patents suggest the novel features of the present invention.

SUMMARY OF THE INVENTION

It is one of the objects of the present invention to provide an advanced technological system designed to enhance the efficiency, accuracy, and management of toll collection.

Another object of this invention is to provide a system that utilizes AI and ML algorithms to automate and optimize tolling processes while improving revenue collection, traffic flow management, and user experience.

The present invention serves multiple objectives, aiming not only to optimize traffic flow and bolster toll collection efficiency but also to markedly reduce environmental impact, thus advancing toward a more sustainable transportation ecosystem. Its sleek design not only minimizes the physical space required for roadside deployments but also stands in contrast to conventional systems reliant on bulky gantries and extensive installations. Through its innovative light-on-the-edge technology, this invention drastically diminishes structural stress, promising a prolonged lifespan for transportation infrastructure. This minimalist approach not only aligns with contemporary design principles but also offers a sustainable and efficient solution tailored to the demands of today's transportation networks.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
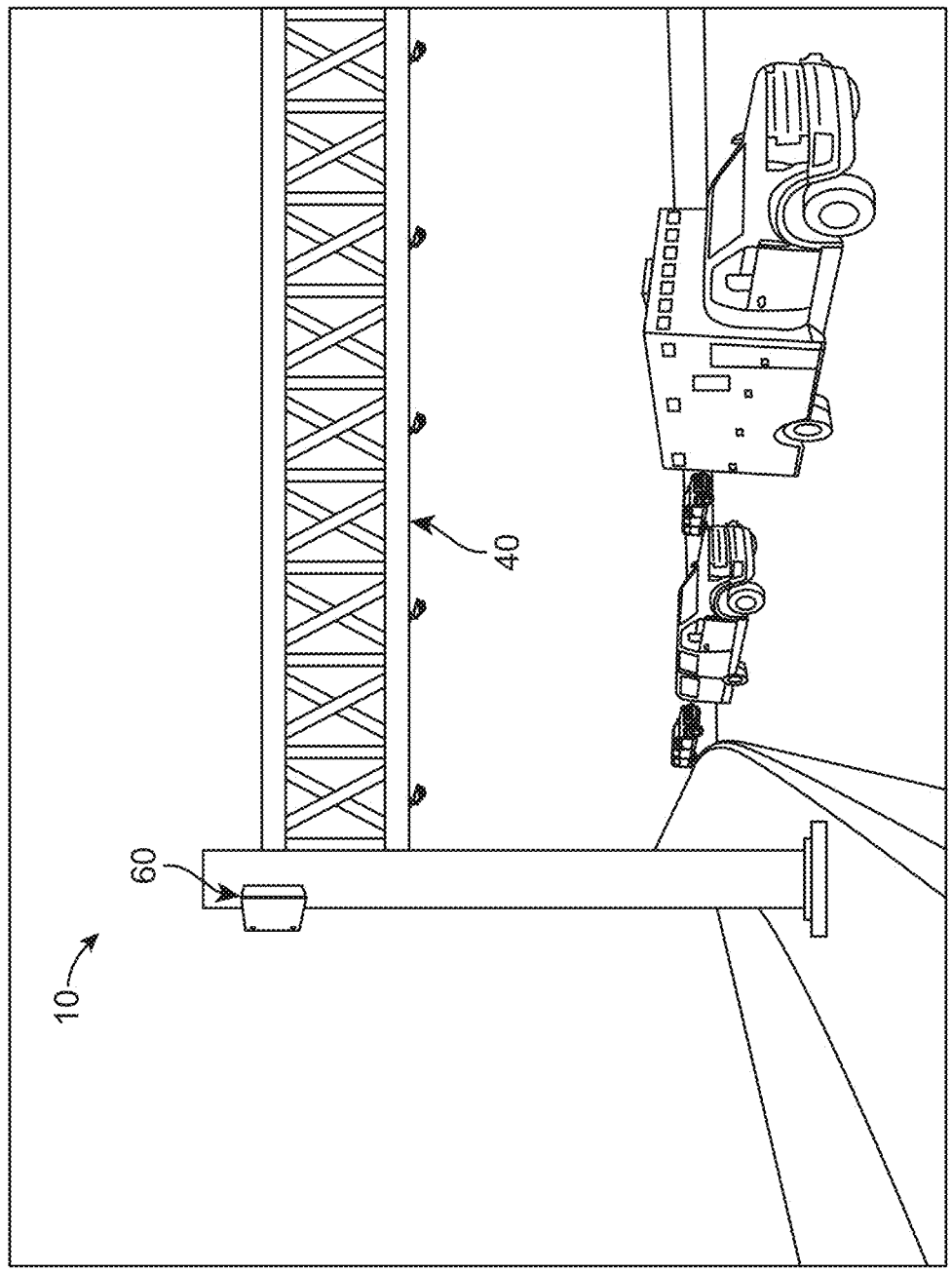
FIG. 1-4 represent operational views of the present invention 10 according to exemplary embodiments.
Figure 2:
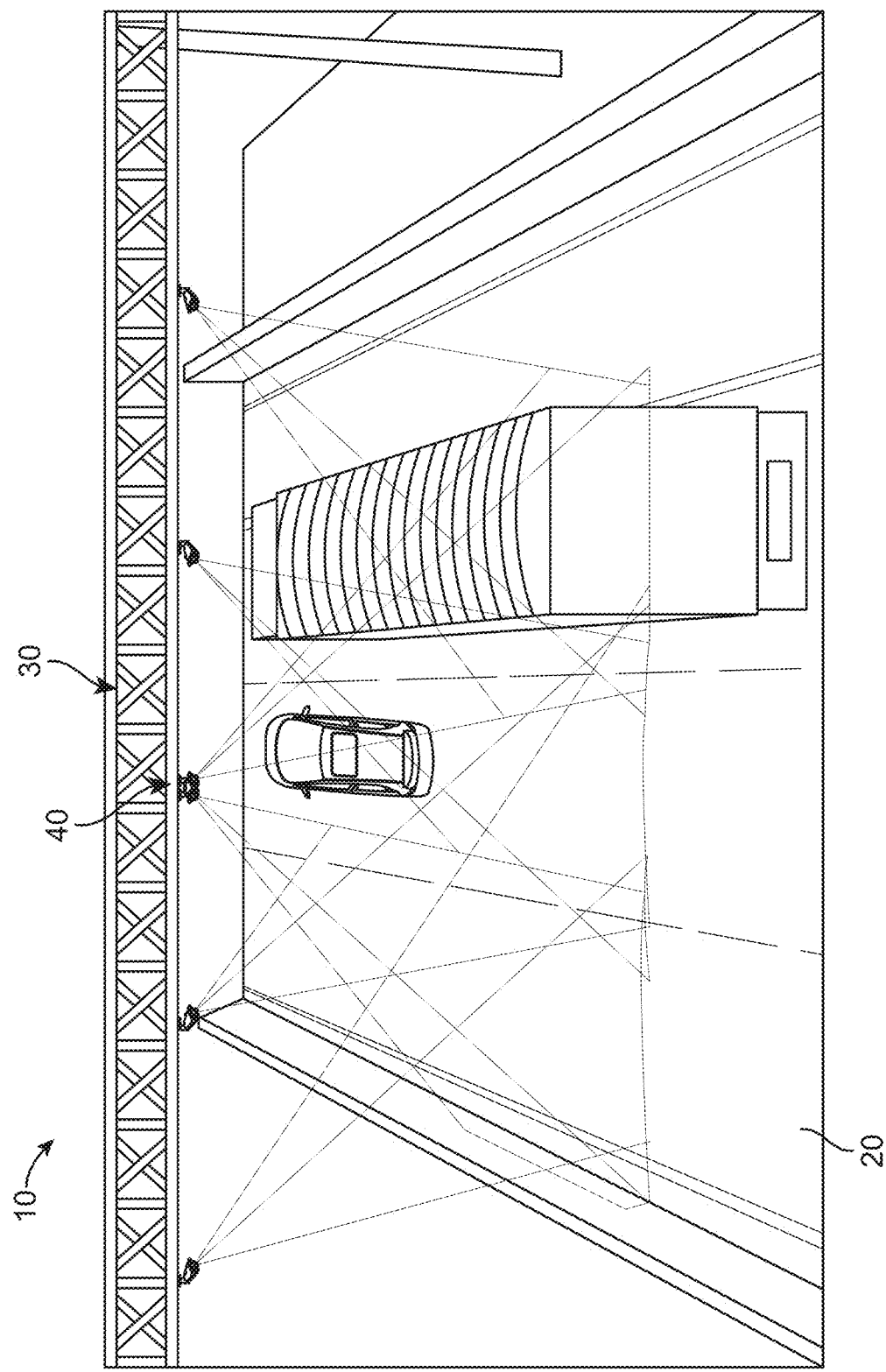
Figure 3:
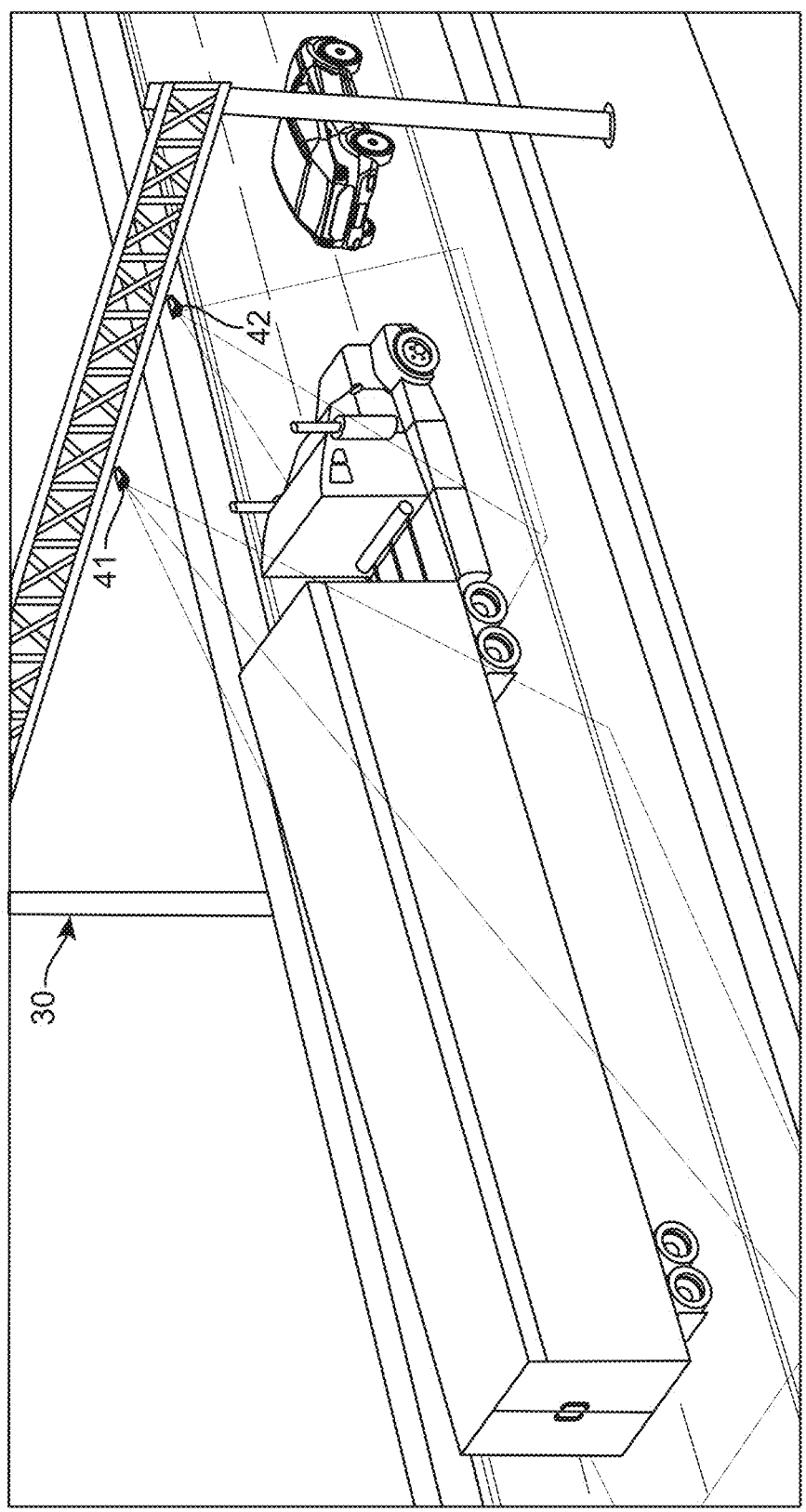
Figure 4:
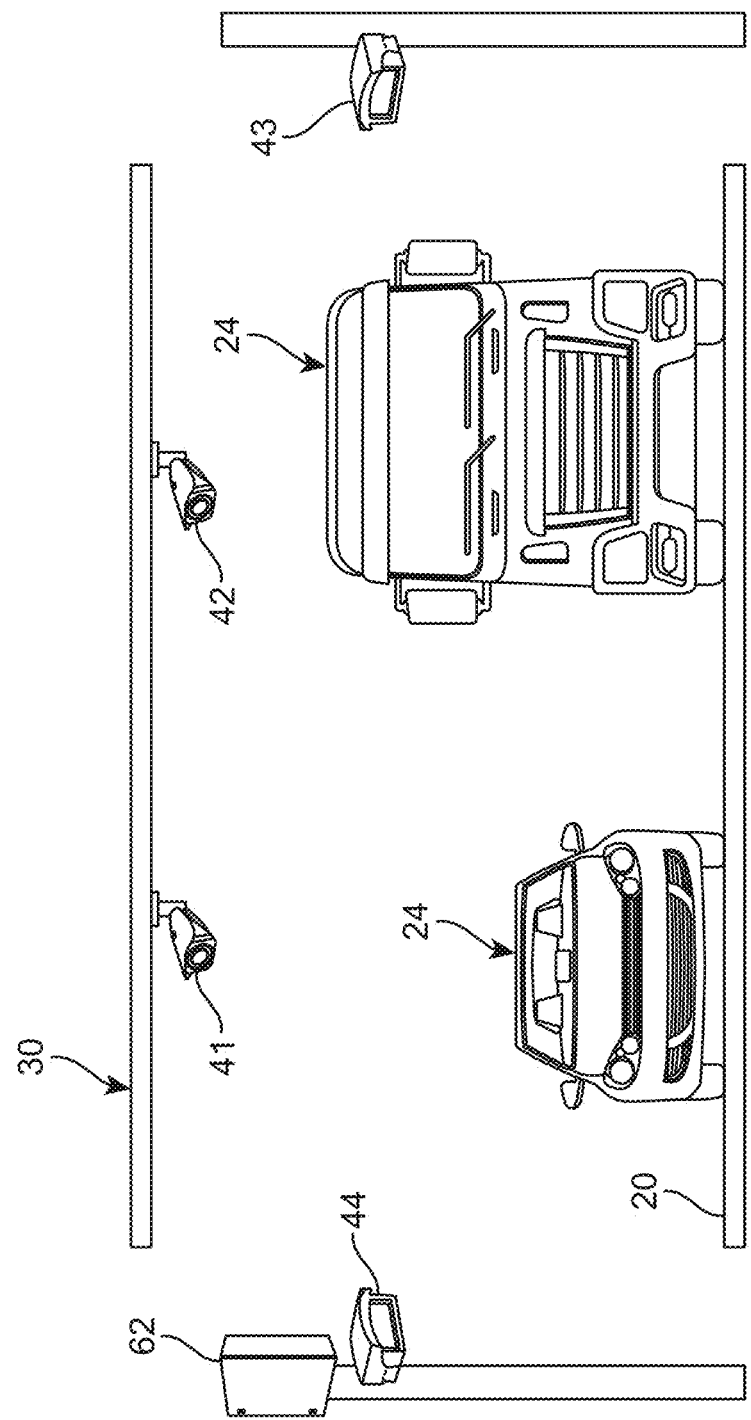
Figure 5:
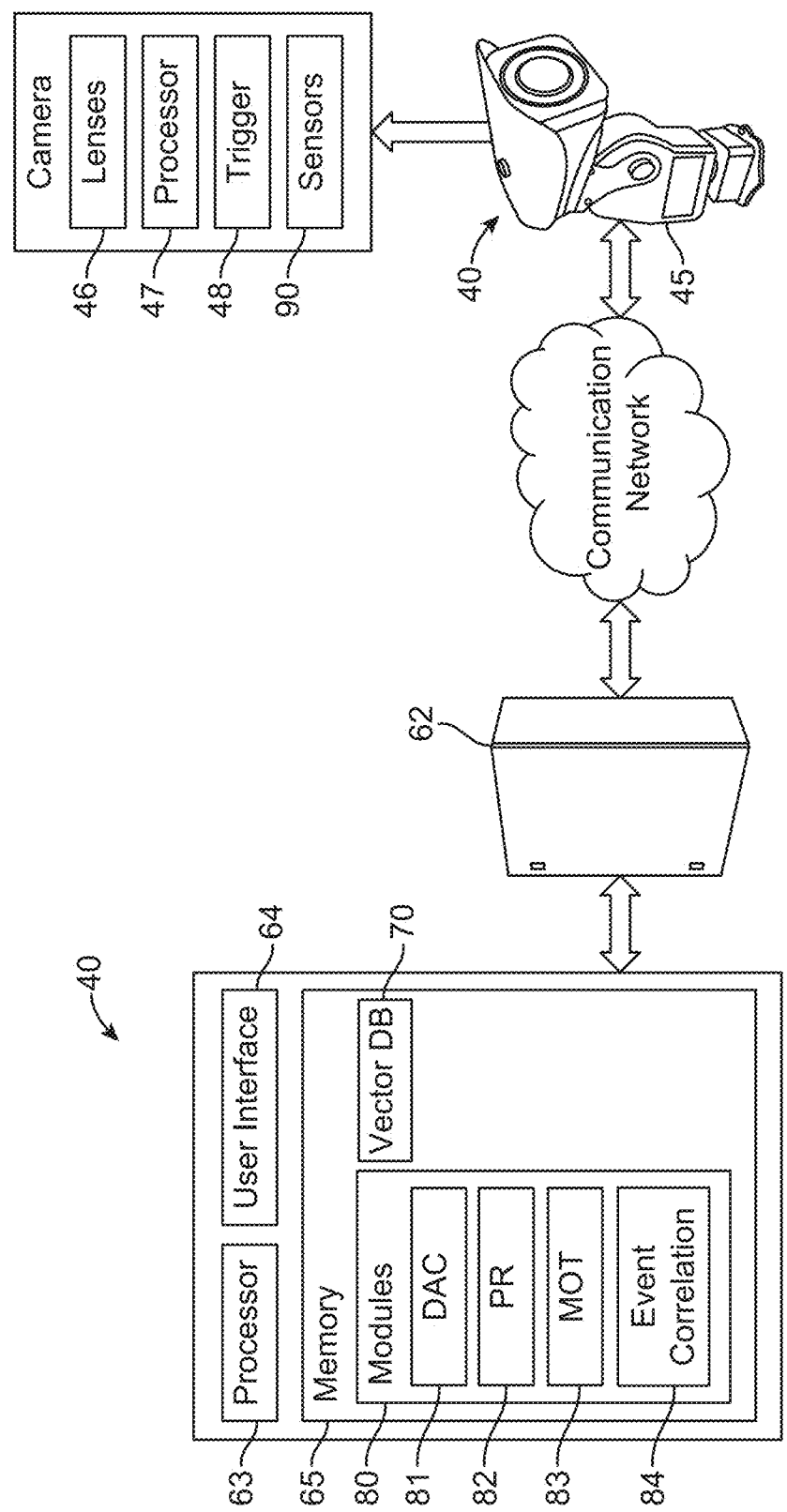
FIG. 5 shows a schematic diagram of the present invention according to an exemplary embodiment.
Figure 6:
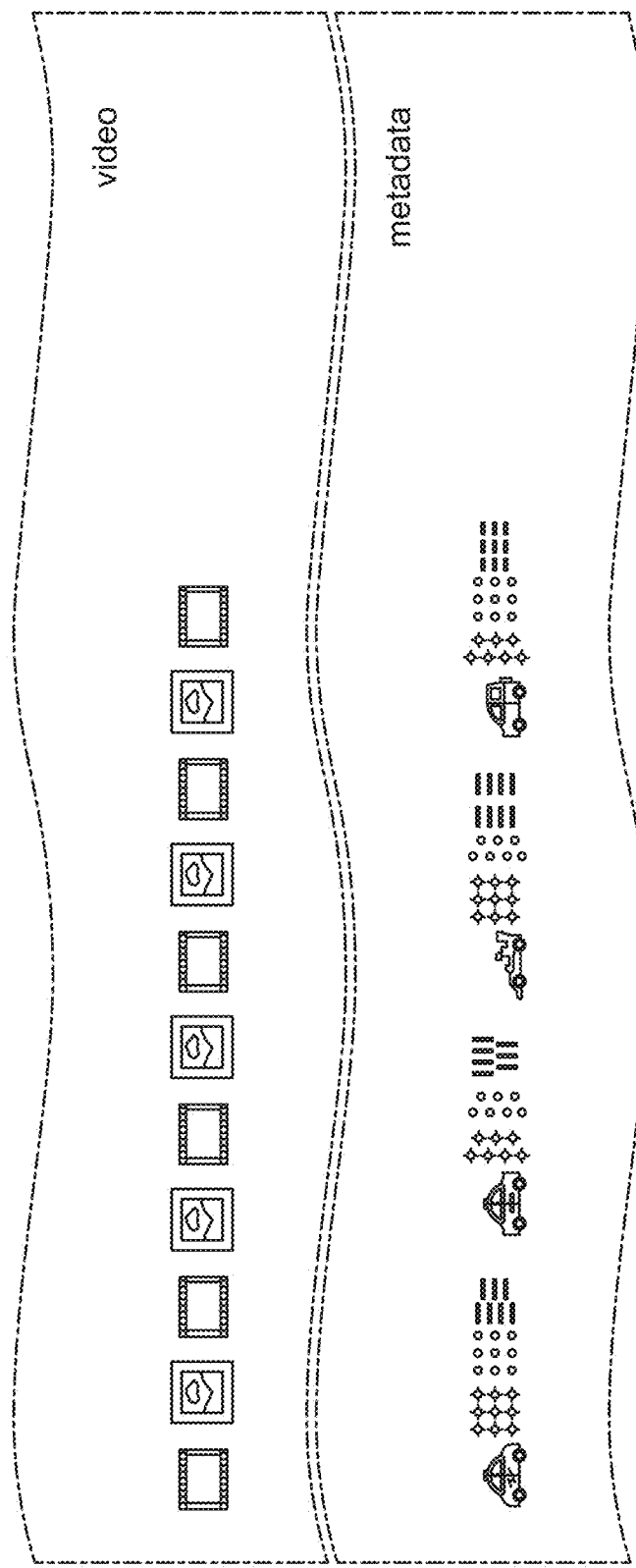
FIG. 6 illustrates a schematic representation of the present invention used for concurrent transmission of video content and associated metadata. Wherein the system combines structured metadata with video data properly synchronized.

Some embodiments of this disclosure, illustrating all its features, will now be discussed in detail. The words "comprising", "having", "containing", and "including", and other forms thereof, are intended to be open-ended in that an item or items following any one of these words is not meant to be an exhaustive listing of such item or items, or meant to be limited to only the listed item or items.

It should also be noted that as used herein and in the appended claims, the singular forms "a", "an", and "the" include plural references unless the context clearly dictates otherwise. Although any systems and methods similar or equivalent to those described herein can be used in the practice or testing of various embodiments of the present disclosure, various embodiments of the systems and methods will be described.

Embodiments of the present disclosure will be described more fully hereinafter with reference to the accompanying drawings in which numerals may represent elements throughout the figures, and in which various example embodiments are shown. Various embodiments may, however, be embodied in many different forms and should not be constructed as limited to the embodiments set forth herein. Therefore, specific details disclosed herein are not to be interpreted as limiting, but rather as a basis and/or principle for the claims, and/or as a representative basis for teaching one skilled in the art to employ this invention in virtually appropriately detailed system, structure, or matter.

The present invention 10 includes a camera assembly 40, preferably mounted on a support structure 30. The camera assembly 40 is positioned in relation to a predetermined area which, in a preferred embodiment, is a road surface 20 traversed by objects, wherein in a preferred embodiment, said objects are going to be vehicles; for the sake of example, the number 24 is used to designate a single terrestrial vehicle, which may have any number of axles 25. The camera assembly 40 is mounted on the support structure 30 at an elevated position above the road surface 20. In alternative exemplary configurations, the camera assembly 40 could be attached to various structures along the roadway, including bridges, overpasses, barriers, or standalone posts positioned horizontally from or adjacent to the road surface 20.

In one embodiment, the camera assembly 40 may comprise a front camera 41, a rear camera 42, a right axle camera 43, and a left axle camera 44. It should be noted that depending on operational conditions such as dimensions of the road surface 20, or the like, the camera assembly 40 may include at least one camera or a plurality of cameras. In the preferred setup, cameras 41 and 42 are placed at an elevated position above the road surface 20, allowing each vehicle to pass beneath the area where the cameras are installed. Conversely, cameras 43 and 44 may be positioned at an elevated height, situated on the sides of the road surface 20. The axle counter system requires the deployment of at least one camera per lane, one dedicated to capturing left-to-right traffic, and another focused on right-to-left traffic. This arrangement enables the cameras to capture footage of both lateral sides of the vehicle 24. Each camera defines a video stream, which is the continuous flow of video data captured by the camera's sensor and transmitted in real-time to a storage medium. It consists of juxtaposed frames, each representing a still image captured at a specific moment in time (t). The cameras of the camera assembly 40 can be embodied as fixed cameras, Pan-Tilt-Zoom (PTZ) cameras, Automatic Number Plate Recognition (ANPR) cameras, License Plate Recognition (LPR) cameras, or any other suitable cameras as known in the art. When affixed to the support structure 30, the cameras are strategically positioned to focus on a specific section of the road surface 20, delineating one or more dedicated zones 50, also referred to as regions of interest (ROIs). These dedicated zones 50 demarcate areas where vehicles entering the camera assembly's 40 field of view (FOV) trigger an event capture sequence. Specifically, when a vehicle crosses a dedicated zone 50, at least one of the cameras in the assembly 40 is automatically triggered to capture the vehicle's presence, as further elaborated in the active mode of operation. The ROIs serve as virtual tripwires, enabling the system to proactively detect and respond to vehicles of interest within the monitored area, initiating data collection and tracking processes crucial for accurate vehicle identification and tolling. Upon a vehicle entering the dedicated zone 50, the camera assembly 40 is configured to gather various data points related to the vehicle 24, including but not limited to: lateral images 27 to record the number of axles 25 (recorded by cameras 43 and 44), front and rear images of the vehicle (24a, 24b), photographs of the front and rear license plates (26), and details regarding the vehicle's model, make, model, color, speed, and classification. The cameras from the camera assembly 40 may be equipped with dual cameras per lane-one dedicated to capturing incoming traffic and another focused on outgoing traffic. Additionally, the cameras may be equipped with dual 5MP lenses 46 and ultra-high-definition Doppler radar for vehicle monitoring. In one embodiment, cameras may also include a processor 47, and a trigger device 48. The system recognizes when a vehicle's axle is raised, such as in the case of a tractor-trailer with a raised trailer axle. By analyzing the video streams from the axle cameras 43 and 44, the system detects raised axles and excludes them from the axle count used to determine the appropriate toll amount for the vehicle. This ensures accurate toll calculation by only factoring in the axles that are in contact with the road surface 20, preventing overcharging due to raised auxiliary axles. The axle detection and counting enhances the system's ability to classify vehicles and apply the correct toll rates based on their axle configurations while traversing the tolling network.

The cameras from the cameras assembly 40 may be affixed to the support structure in an initial position. However, cameras (41, 42, 43, 44) may incorporate an actuation mechanism 45 designed to adjust the positioning and orientation of the cameras autonomously. Wherein such actuation mechanism 45 may operate without human intervention and can be automated based on predetermined conditions. In one exemplary embodiment, the actuation mechanism 45 may be embodied as a motorized pan-tilt unit. A motorized pan-tilt unit allows the camera to pan (move horizontally) and tilt (move vertically) to change its field of view. This unit can be controlled remotely or programmed to respond automatically to specific triggers or conditions. For example, the system may detect a vehicle 24 approaching from a certain direction. Based on this detection, the motorized pan-tilt unit automatically adjusts the camera's position and angle to focus on the vehicle's license plate 26 as it enters the predetermined zone. In another example, the system may detect a sudden increase in traffic congestion or a specific event occurring in a particular area, the actuation mechanism 45 can reposition the cameras 40 to provide better coverage of the affected area, allowing for accurate monitoring and analysis. In another example, when adverse weather conditions are sensed, such as heavy rain or fog, the system can automatically adjust the camera's orientation to minimize interference and maintain optimal visibility, ensuring operation regardless of environmental factors. It is essential to mention that the motorized pan-tilt unit is described herein for explanatory purposes only, as it is recognized that mechanisms to control remotely and reposition cameras (defined herein as actuation mechanism 45) are widely known in the art.

The current invention involves a server assembly 60, which comprises a control hub 62. The control hub 62 which interfaces with the camera assembly 40 either wirelessly or through wired connections. In one exemplary embodiment, the control hub 62 may take the form of a compact module affixed to the support structure 30. The present invention relies on system-on-chip (SoC) devices that incorporate most or all of the components of a computer/electronic system onto a single chip. These components typically include a central processing unit (CPU), memory, input/output ports, and various peripherals such as analog-to-digital converters, digital signal processors, and communication interfaces. SoC devices are designed to be highly integrated, compact, and energy-efficient. By consolidating multiple functions onto a single chip, SoCs offer several advantages, including reduced power consumption, smaller form factors, simplified system design, and lower manufacturing costs. The SoCs approach enables the control hub 62 to be a compact module capable of governing the system's behavior, contrary to legacy systems that require a toll equipment building to house the electronics behind their tolling systems.

The server 60 may include a processor 63, a user interface 64, and a memory 65. The user interface 64 may take the form of a command line interface, a graphical user interface, a voice interface, or a web-based interface. It may be preferable for the memory 65 to be embodied as a hard drive, a network attached storage, or other types of machine-readable medium for the storage of electronic instructions. In one iteration of the present invention 10, vector databases 70 and machine learning (ML) modules 80 may be stored within the memory 65 of the server 60. ML modules 80 may include dynamic adjustment of cameras module 81 (DAC), plate recognition (PR) module 82, and Multi-Object Tracking (MOT) module 83. The multi-object tracking module 83 generates objects/vehicle trajectories from the video streams provided by the camera assembly 40. In one exemplary embodiment, module 83 may use deep learning object detectors to localize vehicles in each frame; in another embodiment, module 83 may use object re-identification models to associate detections of the same vehicle across frames; finally, module 83 may utilize algorithms such as SORT, Deep SORT, BoT-Sort, ByteTrack (state-of-the-art object tracking algorithms) to stitch detections into trajectories. The algorithms listed above are for explanatory purposes only and should not be interpreted in a limiting manner. An event correlation module 84 may also be utilized to address obstructed/incomplete vehicle information. Module 84 may use "nearest neighbor" methods to associate events belonging to the same trajectory and probabilistic data association models to fuse vehicle metadata across events. Module 81 may work in concert with sensors 90 to collect environmental data such as light levels, weather conditions, time of day, etc. This data may then be stored along with labeled image quality scores to serve as a ground of truth. Using the collected data, module 81 may use an ML model trained to predict the optimal camera setting given various environmental conditions, the model may learn the mapping between environmental factors and ideal configuration parameters such as exposure, gain, shutter speed, white balance, etc. for achieving high image quality.

The camera assembly 40 provides one or more video streams to the server assembly 60. A video stream comprises a continuous sequence of video frames captured by a camera over time. The multi-object tracking module 83 processes these video streams to detect and track multiple vehicles simultaneously. Specifically, module 83 applies deep-learning object detectors to localize vehicles in each video frame. It then associates detections of the same vehicle across subsequent frames using re-identification models. Finally, it stitches these associated detections into coherent trajectories using state-of-the-art multi-object tracking algorithms like SORT or Deep SORT. A vehicle's trajectory represents the path taken by that vehicle, comprising a sequence of spatial coordinates and their corresponding timestamps derived from the video streams.

The present invention operates in two main modes: passive mode and active mode. In the following sections the aforementioned modes are going to be described in detail.

Passive Mode

Figure 7:
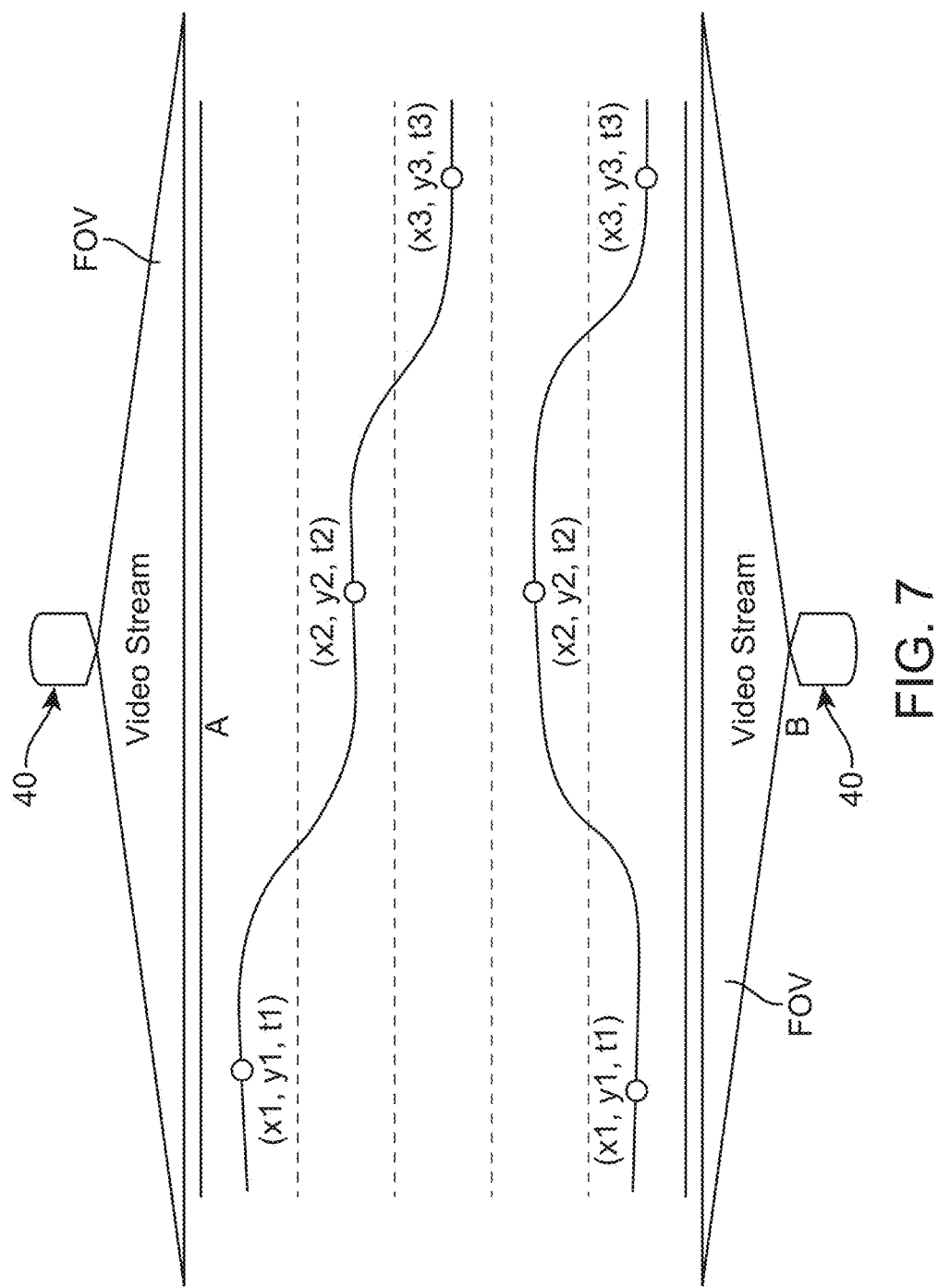
FIG. 7 is an illustrative schematic representation of the present invention operating in passive mode, wherein maps from multiple vehicle trajectories are derived from one or more video streams. The system uses the derived map of trajectories to correlate events emitted from a plurality of roadside devices.

As illustrated in FIG. 7, the passive mode is defined when the camera assembly 40, in conjunction with the server 60 operates autonomously. For a given camera, such as an Automatic Number Plate Recognition (ANPR) camera, the decision to trigger an event is completely handled by the device itself. This can be achieved through integration with a radar to detect when a vehicle has entered or left the region covered by the field of view (FOV) of the camera. The parameters controlling the process (e.g., threshold, confidence level to determine if it makes sense to trigger or not) are established and controlled per device.

As a consequence, the system ends up with a set of disconnected events from each device with different levels of confidence. The system then uses Multi-Object Tracking (MOT) to group those events by vehicle. For the passive mode, specific zones or areas within the field of view of each camera are defined as triggering zones. Every time a vehicle enters the FOV of one camera and passes through the triggering zone, the event is captured and processed.

Traditional systems have the disadvantage that they may receive duplicates or miss some events (e.g., radar failed to trigger). In passive mode, the system may use deduplication techniques (e.g., preferring the highest confidence ANPR event when a camera emitted multiple reads for the same car) and identification of incomplete transactions (e.g., the ANPR didn't capture the vehicle).

Active Mode

Figure 8:
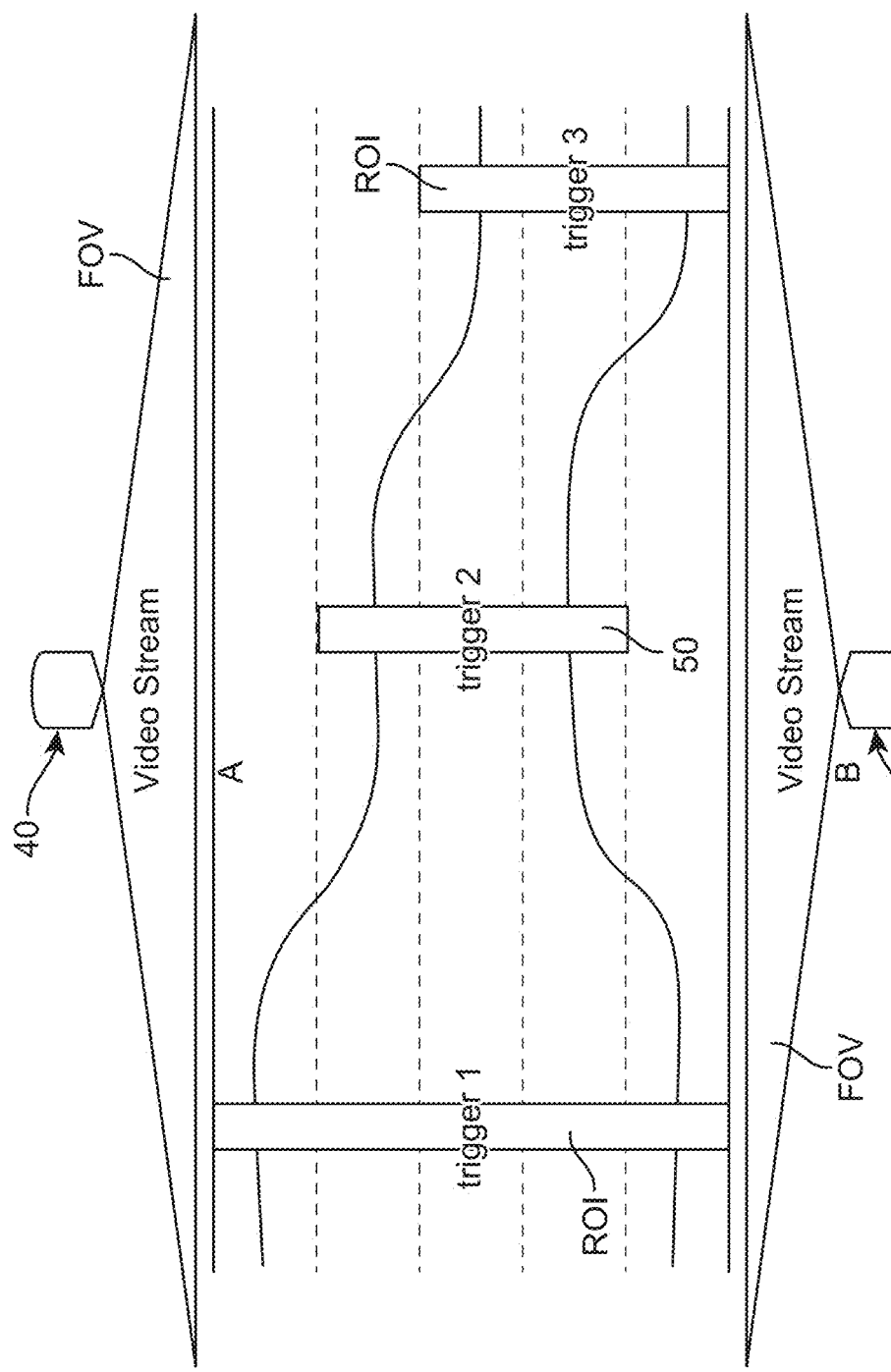
FIG. 8 is a schematic representation of the present invention operating in active mode. Wherein the system has predefined regions of interest mapping the field of view of the cameras. When a vehicle is detected entering a given region of interest, a relevant camera is instructed to make a read. In active mode, the system behaves as a digital trigger for roadside devices, cameras tracking when vehicles enter/leave the triggering zone specified by each individual device.
Figure 9:
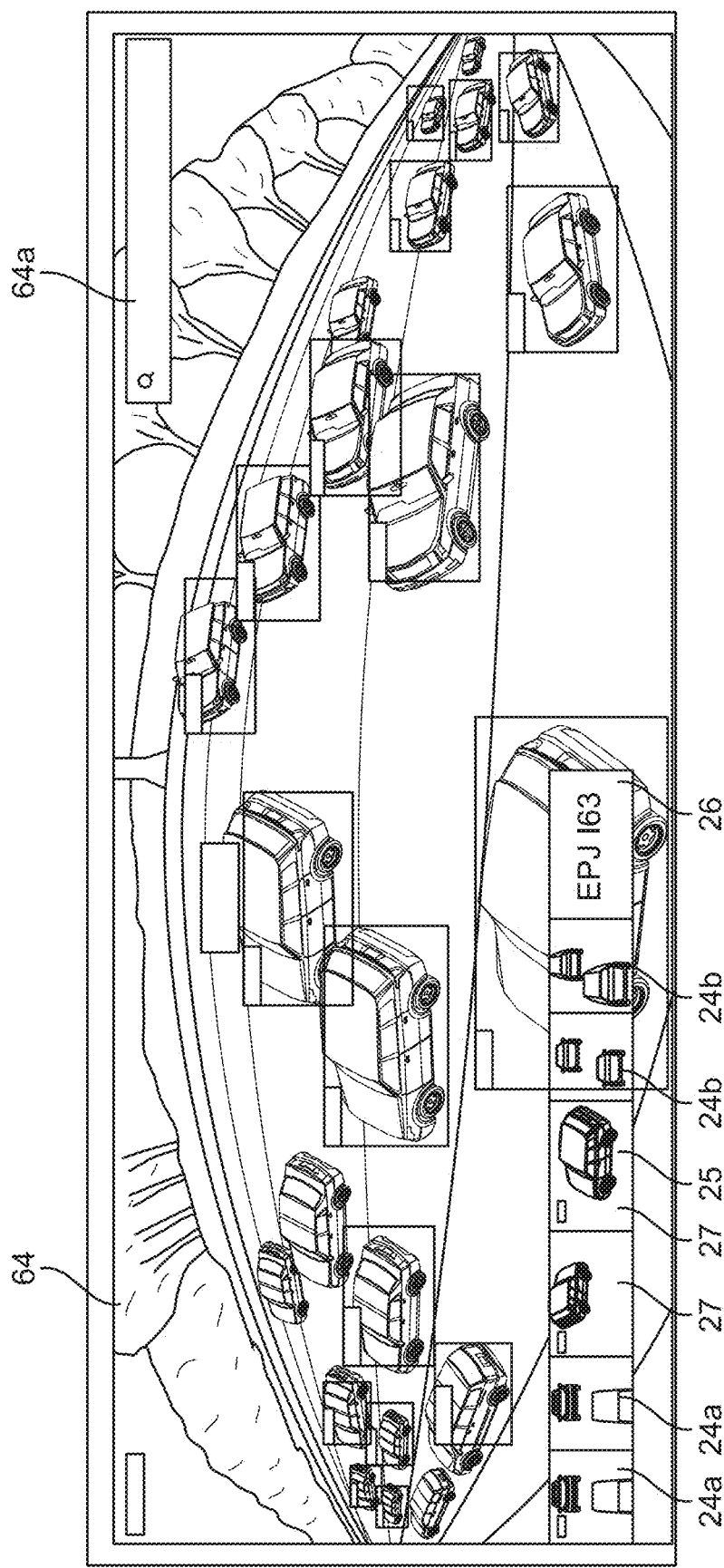
FIG. 9-11 represent exemplary embodiments of the user interface.
Figure 10:
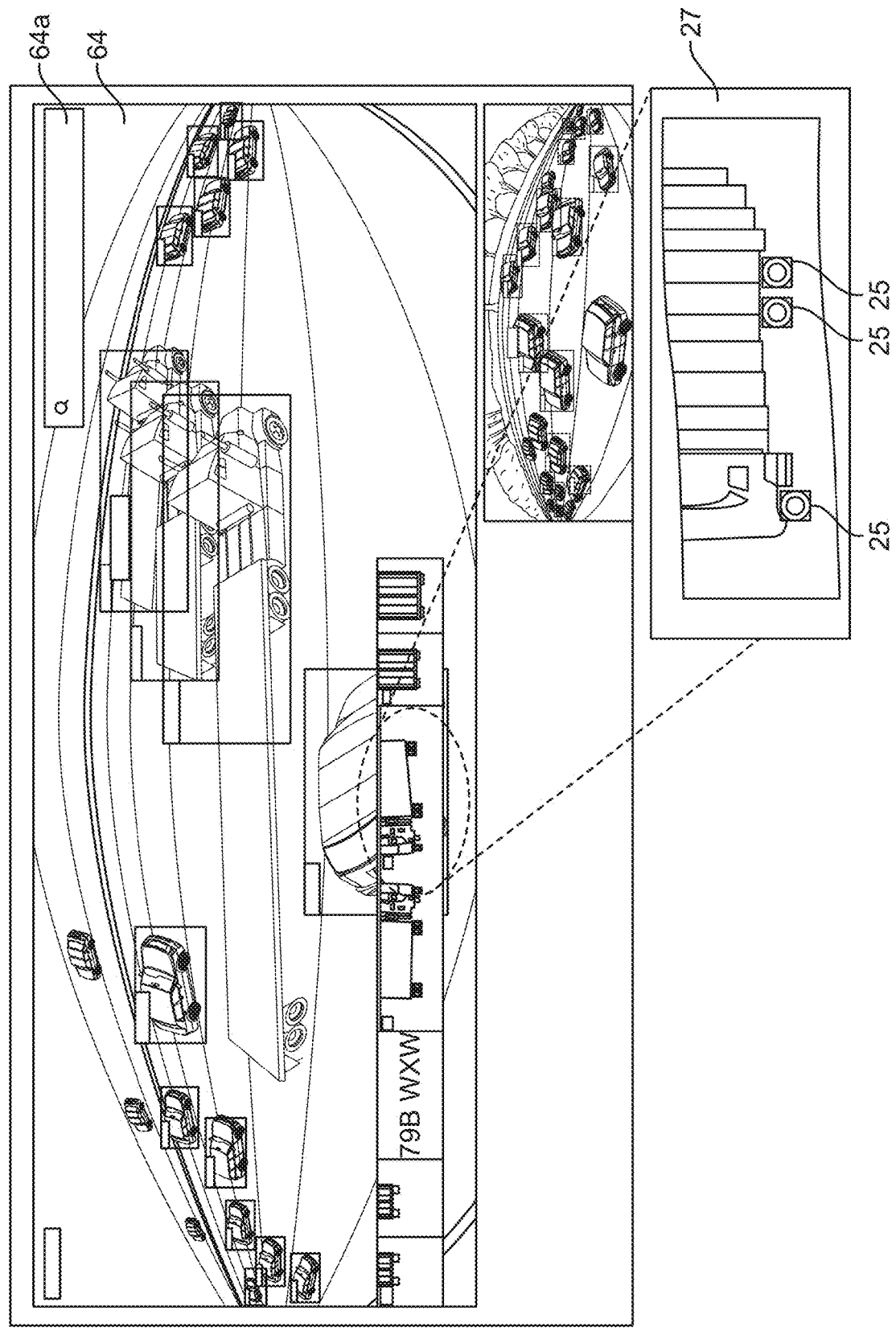
Figure 11:
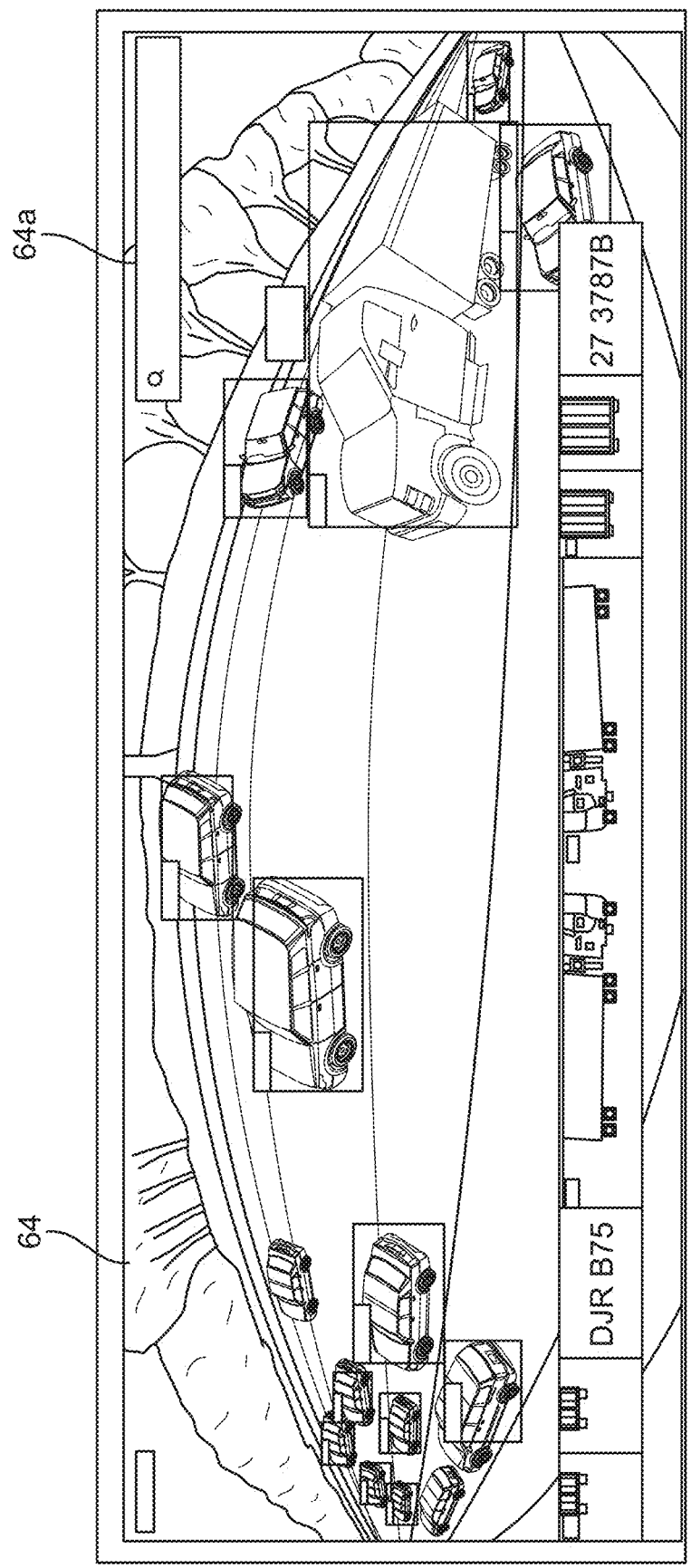

As illustrated in FIG. 8, the active mode refers to the scenario where multi-object tracking and trajectory generation run in real-time. The system has predefined regions of interest (ROIs) that map the field of view of the cameras. When the system detects a vehicle entering a given ROI, it instructs the relevant camera to capture an image or perform a read (this may be done multiple times for the same vehicle and FOV to obtain various samples and improve overall accuracy).

In this operating mode, the system acts as a software-based trigger for the cameras, and the events are naturally correlated. APIs of the cameras allow the trigger to pass some custom data, which is replicated in the event emitted by the device. The custom data is encoded in an identifier of the trajectory that triggered the event. Therefore, when the system processes a set of events emitted by roadside devices, it can identify the trajectory or vehicle with which they are associated.

Contrary to the passive mode, the calibration is centralized (the software is the trigger, and it has a single source to control and adjust the threshold or confidence level to use when deciding whether a read should trigger an event).

In the active mode, the cameras are lighter (no built-in trigger is required, and no radar or computer vision-based processing for object or movement detection is necessary). However, the multi-object tracking must happen in real-time (to determine the location of a vehicle within the FOV of a camera and trigger if appropriate), hence the computing power required roadside is more expensive.

The resulting trajectories enable correlating events captured by the various cameras in the assembly 40 as well as other roadside devices like radars. The event correlation module 84 maps these trajectories in a multi-dimensional space, with two spatial dimensions and one temporal dimension. Roadside events like camera triggers or radar detections can then be associated with specific vehicle trajectories based on their spatial and temporal proximity, using techniques like nearest neighbor methods and probabilistic data association models. This trajectory-based event correlation allows the system to stitch together a comprehensive vehicle profile even when certain events may have captured incomplete information due to obstructions or other factors.

The multi-object tracking (MOT) system integrates multiple synchronized video sources to provide a unified and comprehensive visual representation of the site. This multi-camera setup enhances the accuracy and reliability of the MOT machine learning model by addressing common deployment challenges such as: road alignment, in which the system leverages different camera perspectives to align the MOT model with the road layout, accounting for curved roads, intersections, and other complex geometries; vehicle obstructions, wherein by combining views from multiple cameras, the system overcomes occlusions caused by large vehicles, buildings, or other obstructions that may block the line of sight of a single camera; irregular maneuvers, with a comprehensive view of the site, the MOT model can better track vehicles that exhibit irregular maneuvers, such as sudden lane changes, U-turns, or unexpected stopping/starting; dense traffic, for in high-density traffic scenarios, where vehicles may overlap or occlude each other from a single camera's perspective, the multi-camera setup provides additional viewpoints to maintain accurate tracking; or stop-and-go conditions, wherein the integrated video sources enable the MOT model to reliably track vehicles in stop-and-go traffic conditions, where vehicles frequently change speed or come to a complete stop.

The multi-camera setup is designed to operate in a synchronized manner, ensuring that the video streams from different sources are temporally aligned. This synchronization allows the MOT model to fuse the visual information from various angles and perspectives into a cohesive representation of the site.

By considering multiple viewpoints, the MOT model can achieve higher recall (correctly identifying and tracking more vehicles) and higher precision (reducing false positives or incorrect associations). The integration of multiple video sources effectively reduces blind spots and improves vehicle tracking under diverse traffic scenarios, leading to more accurate multi-object tracking results.

Figure 12:
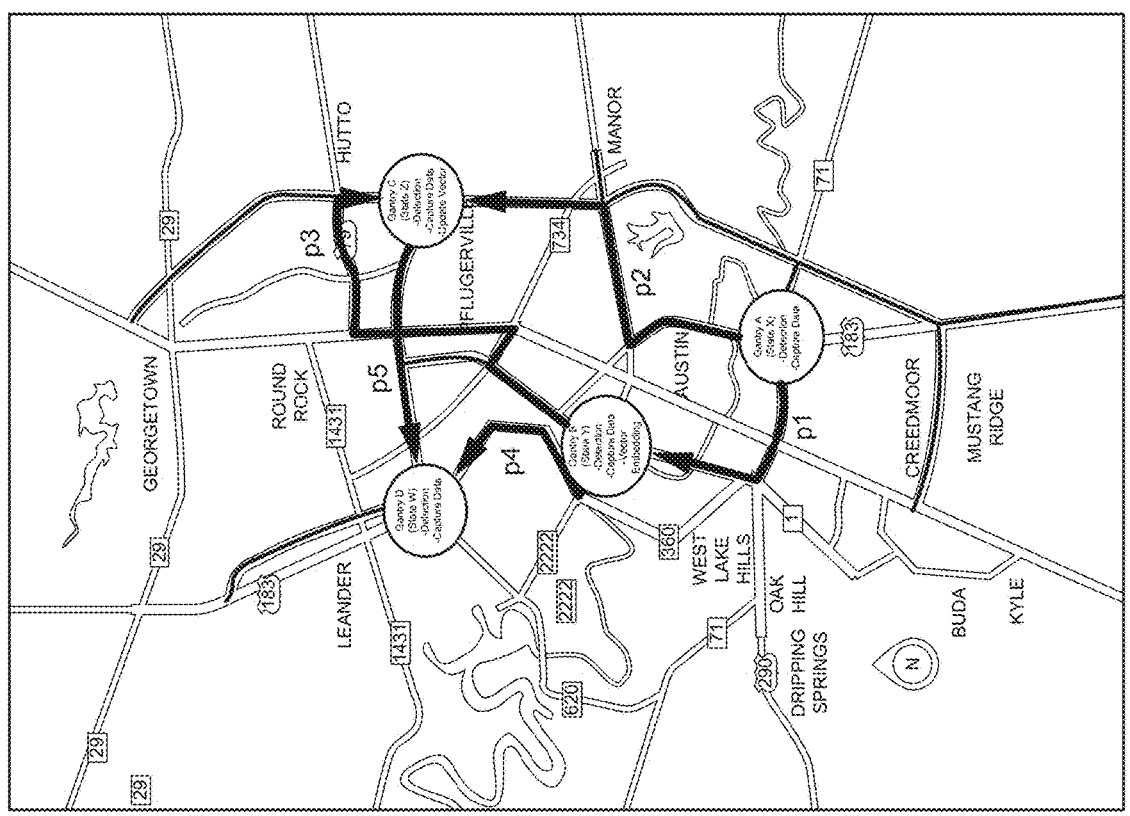
FIG. 12 illustrates an exemplary Markov chain representation embodied in an exemplary road map. The map shows gantries distributed along the roadways at various intersections. Each gantry is labeled with a letter (A-D) and is connected to other gantries, defining a network.

A key aspect of the event correlation process is the generation of robust vector representations or embeddings for each vehicle. While embeddings are commonly associated with natural language processing, the underlying principles apply equally to computer vision and other ML domains. Through a feature extraction process and additional ML inference, the system derives an informative vector embedding that encapsulates the salient attributes of each vehicle, positioning it as a point in a high-dimensional space. With these embeddings computed, determining whether a vehicle A detected at gantry X is the same vehicle A observed at a different gantry Y becomes a straightforward task. By calculating the cosine similarity or employing analogous vector similarity techniques between the embeddings of A at X and A at Y, and applying a sensible threshold, the system can establish whether the two observations correspond to the same vehicle traversing across the different gantry locations as depicted in FIG. 12, wherein pn indicates the probability of a vehicle moving from one gantry to another.

The user interface 64 may be embodied as a graphical user interface (GUI) accessible through a web browser or a dedicated application. The GUI in communication with assembly 40, may provide a live view of the section of the road being monitored. Additionally, the GUI can overlay relevant information onto the video feed, such as vehicle trajectories, license plate numbers, and other vehicle metadata extracted by the system. The GUI can isolate and enclose individual vehicles and lanes within bounding boxes, with tags displaying the license plate number for identified vehicles. In one embodiment, vehicles within the camera's field of view but outside the dedicated zones 50 where the system actively operates may be enclosed in bounding boxes with broken lines to distinguish them from vehicles being actively tracked and tolled within the dedicated zones.

The GUI can include a search interface that allows the user to query using a search bar 64a the vector database 70 for recorded vehicle profiles. The search interface enables quick and efficient similarity-based searches by leveraging the vector embeddings generated for each vehicle. Wherein the user can input various criteria, such as license plate numbers, vehicle make and model, or the like, and the system can retrieve the most similar vehicle profiles from the database by comparing the query against the stored vector embeddings. The vector embeddings, stored in the vector database 70, enable similarity searches by representing each vehicle profile as a high-dimensional vector in a shared embedding space. The system calculates the cosine similarity or other distance metrics between the user's query and the stored embeddings and returns the vehicle profiles with the highest similarity scores. This approach allows for fast and accurate retrieval of relevant vehicle information, even when the query criteria are partial or imprecise. The GUI may further provide tools for analyzing and visualizing the retrieved vehicle profiles, such as displaying the associated trajectories, events triggered at different gantries or cameras, and any other relevant metadata captured by the system. This comprehensive view may aid in monitoring and investigating specific vehicles of interest, as well as auditing the system's performance and accuracy.

The comprehensive vehicle trajectories and associated vehicle profiles generated by the system enable automated tolling. As a vehicle traverses the tolling network covered by the camera assembly 40 and other roadside devices, its trajectory is mapped in space and time based on the correlated events triggered at different locations. Each event captures detailed vehicle information like license plate number, make, model, and axle count. By stitching together this data from multiple events along the vehicle's trajectory, the system builds a robust vehicle profile even if certain details were obstructed or missed at individual event locations. The vehicle's complete trajectory through the tolling network, coupled with its associated metadata like vehicle class and axle configuration, allows the system to automatically calculate the appropriate toll charges based on the applicable pricing policies and roads utilized. This automated, data-driven approach minimizes revenue leakage for toll agencies by ensuring that accurate tolls are charged for every vehicle passing through the network, even in challenging conditions like heavy traffic where conventional single-point tolling systems may miss or incorrectly identify vehicles.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for tolling, comprising:
   a camera assembly, said camera assembly comprising at least one camera configured to capture video streams of vehicles;
   a server assembly comprising a control hub interfaced with said camera assembly; a processor; a memory storing machine learning modules, said machine learning modules comprising:
   a multi-object tracking module configured to generate vehicle trajectories from said synchronized video streams, wherein said multi-object tracking module:
   applies deep learning object detectors to localize vehicles in video frames across multiple viewpoints;
   associates detections of the same vehicle across subsequent video frames using re-identification models; and
   stitches the associated detections into coherent vehicle trajectories representing paths taken by each vehicle over time using multi-object tracking algorithms;
   an event correlation module configured to correlate events associated with said vehicles captured by said camera assembly, and associate said events with said vehicle trajectories;
   said memory containing instructions that when read by the processor causes the system to:
   track vehicles across said video streams using said multi-object tracking module to generate said vehicle trajectories;
   correlate events associated with said vehicles captured by said camera assembly using said event correlation module, and associate said correlated events with corresponding vehicle trajectories;
   synthesize vehicle profiles from said correlated events and associated vehicle trajectories to determine a toll, wherein said vehicle profiles comprise vehicle metadata captured by the at least one camera.

2. The system of claim 1, further comprising a user interface configured to:
   display said video streams and overlay said vehicle trajectories and vehicle metadata;
   provide a search interface for querying a database of recorded vehicle profiles based on similarity measures between user-supplied criteria and vector embeddings representing said vehicle profiles.

3. The system of claim 1, wherein said camera assembly further comprises an actuation mechanism to adjust positioning and orientation of said at least one camera, and wherein said actuation mechanism is controlled by a dynamic adjustment module, which:
   collects environmental data including light levels and weather conditions;
   forecasts optimal camera settings for said at least one camera based on said environmental data using a machine learning model trained on labeled image quality scores;
   control said actuation mechanism to adjust said positioning and orientation of said cameras according to said forecasted optimal camera settings.

4. The system of claim 1, wherein said system operates in an active mode, wherein said multi-object tracking module triggers said cameras to capture events based on locations of vehicles along said vehicle trajectories within preprogrammed dedicated zones; wherein said dedicated zones delineate areas where vehicles come into a field of view of said camera assembly, wherein upon a vehicle entering said dedicated zones, said camera assembly is triggered to gather data related to said vehicle.

5. The system of claim 1, wherein said at least one camera comprises a plurality of cameras.

6. The system of claim 5, wherein said system operates in a passive mode, wherein each of said plurality of cameras independently triggers events based on integrated radar or computer vision-based object detection, when in passive mode said event correlation module maps said vehicle trajectories in a multi-dimensional space comprising spatial and temporal dimensions, and associates said events with said vehicle trajectories based on spatial and temporal proximity using nearest neighbor methods and probabilistic data association models.

7. The system of claim 1, wherein said event correlation module generates vector embeddings representing said vehicle profiles and determines whether events correspond to the same vehicle by calculating vector similarity measures between said vector embeddings.

8. A system for tracking vehicles, comprising:
   a camera assembly, said camera assembly comprising at least one camera configured to capture video streams of vehicles;
   a server assembly comprising a control hub interfaced with said camera assembly; a processor; a memory storing machine learning modules, said machine learning modules comprising:
   a multi-object tracking module configured to generate vehicle trajectories from said synchronized video streams, wherein said multi-object tracking module:
   applies deep learning object detectors to localize vehicles in video frames across multiple viewpoints;
   associates detections of the same vehicle across subsequent video frames using re-identification models; and
   stitches the associated detections into coherent vehicle trajectories representing paths taken by each vehicle over time using multi-object tracking algorithms;
   an event correlation module configured to correlate events associated with said vehicles captured by said camera assembly, and associate said events with said vehicle trajectories;
   said memory containing instructions that when read by the processor causes the system to:
   track vehicles across said video streams using said multi-object tracking module to generate said vehicle trajectories;
   correlate events associated with said vehicles captured by said camera assembly using said event correlation module, and associate said correlated events with corresponding vehicle trajectories;
   synthesize vehicle profiles from said correlated events and associated vehicle trajectories to determine an event.

9. A system for tracking objects, comprising:
   a camera assembly, said camera assembly comprising at least one camera configured to capture video streams of objects;
   a server assembly comprising a control hub interfaced with said camera assembly; a processor; a memory storing machine learning modules, said machine learning modules comprising:

a multi-object tracking module configured to generate object trajectories from said synchronized video streams, wherein said multi-object tracking module: applies deep learning object detectors to localize objects in video frames across multiple viewpoints;

associates detections of the same object across subsequent video frames using re-identification and models;

stitches the associated detections into coherent object trajectories representing paths taken by each object over time multi-object tracking algorithms;

an event correlation module configured to correlate events associated with said objects captured by said camera assembly, and associate said events with said object trajectories;

said memory containing instructions that when read by the processor causes the system to:

track objects across said video streams using said multi-object tracking module to generate said objects trajectories;

correlate events associated with said objects captured by said camera assembly using said event correlation module, and associate said correlated events with corresponding object trajectories;

synthesize object profiles from said correlated events and associated object trajectories to determine an event, wherein said object profiles comprise object metadata captured by the at least one camera.

* * * * *